(12) United States Patent
Merlin et al.

(10) Patent No.: US 9,137,826 B2
(45) Date of Patent: Sep. 15, 2015

(54) APPARATUS AND METHOD FOR TRANSMISSION AND RECOVERY MODES FOR AN RTS/CTS SYSTEM THAT UTILIZES MULTICHANNELS

(75) Inventors: Simone Merlin, San Diego, CA (US); Guido Robert Frederiks, Aptos, CA (US); Srinivas Kandala, Santa Clara, CA (US); Vincent Knowles Jones, IV, Redwood City, CA (US)

(73) Assignee: Qualcomm Incorporated, San Diego, CA (US)

( * ) Notice: Subject to any disclaimer, the term of this patent is extended or adjusted under 35 U.S.C. 154(b) by 259 days.

(21) Appl. No.: 13/235,078

(22) Filed: Sep. 16, 2011

(65) Prior Publication Data
US 2013/0070668 A1 Mar. 21, 2013

(51) Int. Cl.
*H04W 74/08* (2009.01)
*H04W 84/12* (2009.01)

(52) U.S. Cl.
CPC .......... *H04W 74/0816* (2013.01); *H04W 74/08* (2013.01); *H04W 84/12* (2013.01)

(58) Field of Classification Search
None
See application file for complete search history.

(56) References Cited

U.S. PATENT DOCUMENTS

| 7,746,879 | B2 | 6/2010 | Kangude et al. |
| 7,796,632 | B2 | 9/2010 | Hasty et al. |
| 2002/0152324 | A1* | 10/2002 | Sherman ................. 709/245 |
| 2007/0002814 | A1* | 1/2007 | Benveniste ............. 370/338 |
| 2007/0147322 | A1 | 6/2007 | Agrawal et al. |
| 2007/0201401 | A1* | 8/2007 | Benveniste ............. 370/329 |
| 2007/0297353 | A1* | 12/2007 | Habetha et al. ........ 370/310 |
| 2011/0194644 | A1* | 8/2011 | Liu et al. ................. 375/295 |
| 2011/0235576 | A1* | 9/2011 | Gong et al. ............. 370/328 |
| 2012/0182886 | A1* | 7/2012 | Ong et al. ............... 370/252 |
| 2012/0320856 | A1* | 12/2012 | Kim et al. ............... 370/329 |
| 2013/0176926 | A1* | 7/2013 | Lee et al. ................ 370/311 |

FOREIGN PATENT DOCUMENTS

| WO | 2009154406 A2 | 12/2009 |
| WO | 2011099791 A2 | 8/2011 |

OTHER PUBLICATIONS

International Search Report and Written Opinion—PCT/US2012/055766—ISA/EPO—Nov. 26, 2012.

(Continued)

*Primary Examiner* — Eunsook Choi
(74) *Attorney, Agent, or Firm* — Kevin T. Cheatham

(57) ABSTRACT

A method, apparatus and computer readable medium for an RTS/CTS system that utilizes a plurality of channels for data transfer, includes sending, by a first device, an RTS frame over the plurality of channels; receiving, by a second device, the RTS frame and outputting a CTS frame to the first device based on receipt of the RTS frame, the CTS frame being output over at least one of the plurality of channels; setting, by each device within a network that receives the RTS frame, a network allocation vector (NAV) to a time duration that is based in part on information included in the RTS frame; and transmitting, by the first device, data to the second device within the time duration set by the NAV using the at least one of the plurality of channels.

27 Claims, 5 Drawing Sheets

(56) References Cited

OTHER PUBLICATIONS

Xu L., et al., "Performance Comparison Between Channel-Bonding and Multi-Channel CSMA" IEEE Wireless Communications and Networking Conference, 2007, WCNC 2007, Mar. 11-15, 2007, Hong Kong, IEEE Operations Center, Piscataway, NJ, Mar. 1, 2007, pp. 406-410, XP031097218, DOI: 10.1109/WCNC.2007.80 ISBN: 978-1-4244-0658-6 Section II.

Zhang, M. et al. "Dynamic Priority Backoff Algorithm for IEEE 802.11 DCF". IEEE 2008 International Conference on Computer Science and Software Engineering, 956-958, (Dec. 2008).

\* cited by examiner

APPARATUS AND METHOD FOR TRANSMISSION AND RECOVERY MODES FOR AN RTS/CTS SYSTEM THAT UTILIZES MULTICHANNELS

BACKGROUND

1. Field of the Disclosure

This disclosure relates generally to apparatus and methods for a wireless system that utilizes the RTS/CTS protocol. More particularly, the disclosure relates to an apparatus and method for transmission and recovery modes for an RTS/CTS system that utilizes multiple channels.

2. Related Art

One type of wireless system is an RTS/CTS protocol system. In this system, a source node that desires to send data to a destination node over a communications channel sends a Request to Send frame (RTS) to the destination node over the communications channel. The RTS frame is also received by other nodes in the system that are in the vicinity of the sending node, and those other nodes should refrain from sending data for a given time, which is called a Network Access Vector (NAV) duration. The destination node sends back a Clear to Send frame (CTS) to the sending node, if it is available to receive data. The amount of time that a node should wait before trying to get access to a channel (the NAV duration) is included in both the RTS frame and the CTS frame.

A problem exists in the RTS/CTS protocol for multichannel wireless systems, in which the CTS bandwidth is smaller than the RTS bandwidth, in which the NAV duration has to be reset accordingly.

SUMMARY OF THE DISCLOSURE

Various embodiments are directed to an information providing a method for an RTS/CTS system that utilizes a plurality of channels for data transfer. In some embodiments, the method includes sending, by a first device, an RTS frame over the plurality of channels; receiving, by a second device, the RTS frame and outputting a CTS frame to the first device based on receipt of the RTS frame, the CTS frame being output over at least one of the plurality of channels; setting, by each device within a network that receives the RTS frame, a network allocation vector (NAV) to a time duration that is based in part on information included in the RTS frame; and transmitting, by the first device, data to the second device within the time duration set by the NAV using the at least one of the plurality of channels.

In various other embodiments, the method includes sending, by a first device, a first RTS frame over the plurality of channels, the first RTS frame including a first network allocation vector (NAV) set to a time duration that includes at least a second RTS frame and a second CTS frame; receiving, by a second device, the first RTS frame and outputting a first CTS frame to the first device based on receipt of the first RTS frame, the first CTS frame being output over at least one of the plurality of channels; sending, by the first device, a second RTS frame over the at least one of the plurality of channels based on receipt of the first CTS frame over the at least one of the plurality of channels, the second RTS frame including a second NAV; receiving, by the first device over the at least one of the plurality of channels, a second CTS frame output by the second device based on the second device receiving the second RTS frame; setting, by each device within a network that receives the second RTS frame and the second CTS frame, a NAV to a time duration that is based in part on information included in the second RTS frame; and transmitting, by the first device, data to the second device within the time duration set by the second NAV using the at least one of the plurality of channels.

In various other embodiments, a non-transitory computer readable medium stores computer program product for RTS/CTS system that utilizes a plurality of channels for data transfer, and causing at least computer to perform the functions of: sending, by a first device, an RTS frame over the plurality of channels; receiving, by a second device, the RTS frame and outputting a CTS frame to the first device based on receipt of the RTS frame, the CTS frame being output over at least one of the plurality of channels; setting, by each device within a network that receives the RTS frame, a network allocation vector (NAV) to a time duration that is based in part on information included in the RTS frame; and transmitting, by the first device, data to the second device within the time duration set by the NAV using the at least one of the plurality of channels.

In various other embodiments, an apparatus utilizes a Request-to-Send/Clear-to-Send (RTS/CTS) protocol for sending data to another apparatus over a network. The apparatus includes a processor configured to create an RTS frame over a plurality of channels to the another apparatus, the plurality of channels corresponding to channels by way data is desired to be sent from the apparatus to the another apparatus. The apparatus also includes a receiver configured to receive a CTS frame sent by the another apparatus over at least one of the plurality of channels. The apparatus transmits data to the another apparatus using the at least one of the plurality of channels, within a time duration set in part based on information contained within the RTS frame.

In various other embodiments, an apparatus utilizes a Request-to-Send/Clear-to-Send (RTS/CTS) protocol for sending data to another apparatus over a network, and includes means for sending an RTS frame over the plurality of channels. The apparatus also includes means for setting a network allocation vector (NAV) to a time duration that is based in part on information included in the RTS frame. The apparatus further includes means for receiving a CTS frame over at least one of the plurality of channels. The apparatus still further includes means for transmitting data to another apparatus within the time duration set by the NAV using the at least one of the plurality of channels.

In various other embodiments, an apparatus utilizes a Request-to-Send/Clear-to-Send (RTS/CTS) protocol for sending data to another apparatus over a network, and includes means for sending a first RTS frame over the plurality of channels, the first RTS frame including a first network allocation vector (NAV) set to a time duration that includes at least a second RTS frame and a second CTS frame. The apparatus also includes means for receiving a first CTS frame over at least one of the plurality of channels. The apparatus further includes means for sending a second RTS frame over the at least one of the plurality of channels based on receipt of the first CTS frame over the at least one of the plurality of channels, the second RTS frame including a second NAV. The apparatus still further includes means for receiving a second CTS frame over the at least one of the plurality of channels. The apparatus also includes means for setting a NAV to a time duration that is based in part on information included in the second RTS frame. The apparatus further includes means for transmitting data to another apparatus within the time duration set by the second NAV using the at least one of the plurality of channels.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various embodiments of a wireless system that utilizes the RTS/CTS protocol are described hereinbelow.

In a multichannel wireless system, in which the RTS frame is transmitted over a plurality of channels, but in which the CTS frame is transmitted back on only a subset of the channels in which the RTS frame was transmitted, the inventors of this application determined that the NAV duration should be reset accordingly, due to the smaller CTS bandwidth as compared to the RTS bandwidth. This is because the data to be transmitted from a source node to a destination node is over a smaller bandwidth than what was requested to be used in the RTS frame, in which the smaller bandwidth is set in the CTS frame sent from the destination node to the source node. As such, the NAV duration for the source node, the destination node, and all other nodes in the wireless network that have received the RTS frame and the CTS frame have to reset their respective NAV duration based on the lesser bandwidth provided for data transmission between the source node and the destination node.

Figure 1:
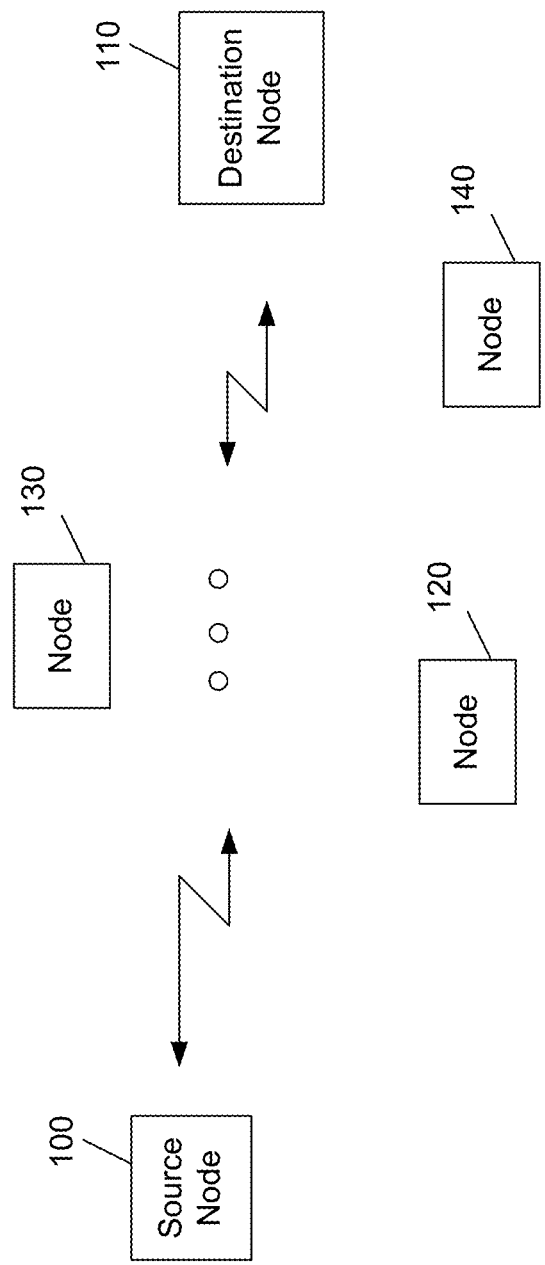
FIG. 1 shows a plurality of nodes in a wireless network that utilizes an RTS/CTS protocol for data transfer between nodes.
Figure 2:
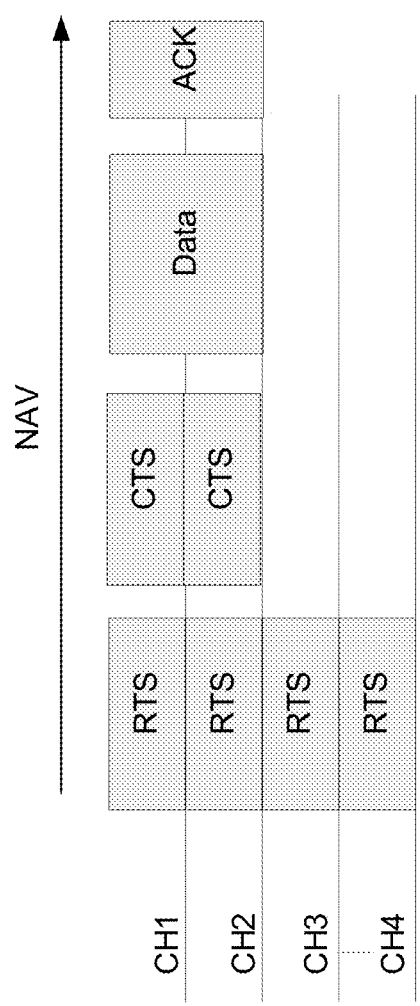
FIG. 2 shows the features of data transfer using the RTS/CTS protocol in accordance with a first embodiment of the invention.

In a first embodiment of the invention, as shown in FIG. 1 and FIG. 2, a source node 100 sends an RTS frame on all of the channels intended for transmission. In one implementation consistent with the first embodiment, the RTS frame is sent in duplicate mode with 11a preamble, with bandwidth information included. As shown in FIG. 1, the RTS frame is sent over four channels, CH1, CH2, CH3 and CH4. A destination node 110 receiving the RTS frame sends back a CTS frame, in which only two of the four channels, CH1 and CH2, are indicated as being available to receive data by the destination node.

The nodes in the wireless network that receive the RTS frame and the CTS frame, such as nodes 120, 130 and 140 in FIG. 1, initially set their respective NAV durations for the respective channels CH1 and CH2 based on the information provided in the RTS frame. Specifically, the NAV duration is set by the RTS frame to a duration that is computed based on the bandwidth used by the RTS frame and the amount of data to be sent, subject to a maximum timeout (TXOP) limit.

In more detail, the NAV duration is set equal to:

$$\text{NAV duration} = \text{Data } Tx \text{ frame(s) time} + \text{CTS frame time} + Ack \text{ frame time} + 3*SIFS,$$

in which the CTS frame time, the Ack frame time, and the interframe time SIFS are all times known in advance by each node in the wireless network and correspond to default time values. The interframe time SIFS is multiplied by three (3), since that corresponds to the interframe times between the RTS frame, the CTS frame, the Data frame(s), and the Ack frame. By way of example, SIFS is equal to 16 µseconds. The Ack frame time corresponds to the time to acknowledge receipt of data without errors, and is set to a known, default value for purposes of NAV duration computation.

The Data Tx frame(s) time is computed by each node based on the RTS bandwidth, which in the example shown in FIG. 2 corresponds to the total bandwidth of channels CH1, CH2, CH3 and CH4. By way of example, if each channel is 20 MHz wide, the Data Tx frame(s) time is computed based on an RTS bandwidth of 80 MHz. Using the 80 MHz bandwidth, and the amount of data requested to be transferred from the source node to the destination node over the four channels, as set forth in the RTS frame (e.g., 1 Gbyte of data) each node can readily compute the Data Tx frame(s) time.

In an example that uses the first embodiment, as shown in FIG. 2, since the CTS frame is sent only on channels CH1 and CH2, which is a smaller bandwidth (e.g., 40 MHz) than the RTS bandwidth (e.g., 80 MHz), data is sent by the source node on the smaller bandwidth indicated by the CTS frame, and the amount of data that can be sent from the source node 100 to the destination node 110 is recomputed by each node receiving the RTS frame and CTS frame based on the NAV originally set by the RTS frame and the new, smaller bandwidth as provided in the CTS frame. That is, in the example shown in FIG. 2, because the NAV duration is set based on the RTS frame, the amount of data that can be sent is halved (e.g., from 1 GHz to 500 MHz), since the NAV duration remains the same. Once the NAV duration is finished, the RTS/CTS protocol allows for any node on the network to request to transmit over one or more channels to a destination node on the network, in a manner known to those of ordinary skill in the art.

Figure 3:
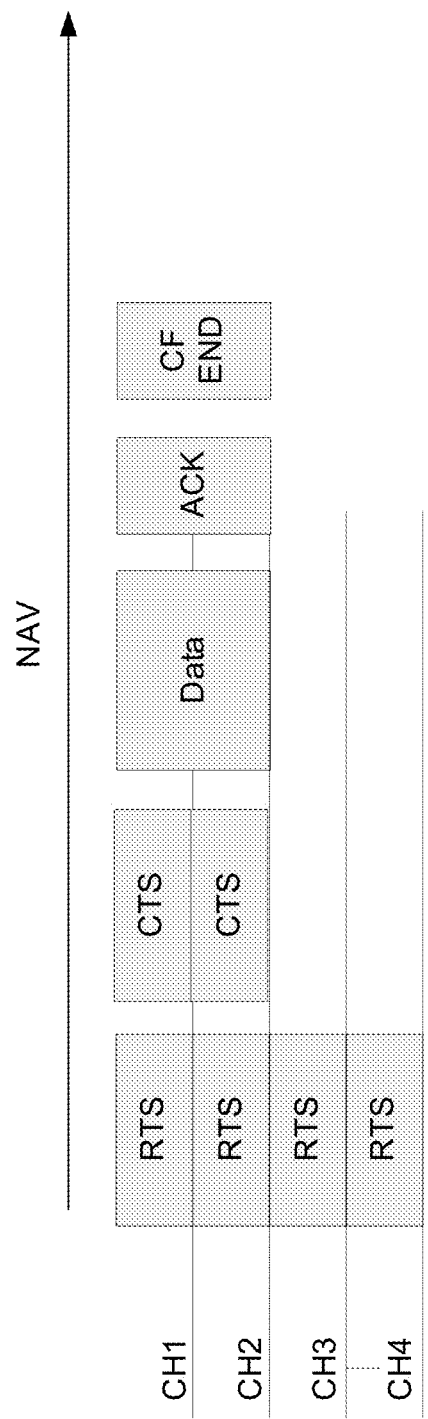
FIG. 3 shows the features of data transfer using the RTS/CTS protocol in accordance with a second embodiment of the invention.

A second embodiment of the invention is described below with reference to FIG. 1 and FIG. 3. In the second embodiment, like the first embodiment, the RTS frame is sent on all of the channels intended for transmission by the source node 100 to the destination node 110. In one implementation of the second embodiment, the RTS frame is sent in duplicate mode with 11a preamble, with bandwidth information included. As shown in FIG. 3, the RTS frame is sent over four channels, CH1, CH2, CH3 and CH4. The destination node 110 receiving the RTS frame sends back a CTS frame, in which only two of the four channels, CH1 and CH2, are indicated as being available to receive data by the destination node.

In a first implementation consistent with the second embodiment, unlike the first embodiment, the NAV duration is set by all nodes receiving the RTS frame based on a constant time value, which is independent from the amount of data to be transmitted and the bandwidth to be used for the data transmission. By way of example, the constant time value is set to a timeout duration, or TXOP duration, which is a timeout duration set by the RTS/CTS protocol (e.g. a default value).

In a second implementation consistent with the second embodiment, the NAV duration is computed based on a minimum bandwidth and the amount of data to be sent from the source node 100 to the destination node 110, in which the minimum bandwidth may correspond to the bandwidth of only one channel in a multi-channel wireless environment. By way of example, this minimum bandwidth is 20 MHz, which the bandwidth of one channel. Other minimum bandwidth values may be utilized based on the channel requirements of a particular network, such as a minimum channel value of 1 MHz or 500 MHz, for example. In other implementations, the minimum bandwidth may correspond to a portion of a single channel, such as 5 MHz (¼ of a channel) in the example described herein.

In the second implementation consistent with the second embodiment, the NAV duration is set to a value based on the following equation:

NAV duration=Data *Tx* frame(s) time+CTS frame time+*Ack* frame time+3**SIFS*, in which the CTS frame time, the Ack frame time, and the interframe time SIFS are all times known in advance by each node in the wireless network and correspond to default time values, and in which the Data Tx frame (s) time is computed based on the minimum bandwidth (e.g., MHz) and not the RTS bandwidth (e.g., 80 MHz).

If the CTS frame is sent back from the destination node 110 to the source node 100 on a bandwidth smaller than the bandwidth of the RTS frame, then the data is sent from the source node 100 to the destination node 110 up to the completion of the available data or to the NAV duration limit, which comes first. In the example shown in FIG. 3, since the CTS is sent on a 40 MHz bandwidth corresponding to the bandwidth of CH1 and CH2 (20 MHz for each channel), data is sent based on the NAV duration computed based on a single 20 MHz channel, and thus the entire amount of data is sent from the source node 100 to the destination node 110 before the NAV duration is reached.

In the example shown in FIG. 3, only about one-half of the NAV duration is actually utilized in the transfer of data from the source node 100 to the destination node 110, and so in the second embodiment, an All Clear/End (CF-END) signal is output by the source node 100 when it has completed its complete data transfer to the destination node 110. The nodes on the network that receive the CF-End signal are notified that the channels (CH1 and CH2 in the example shown in FIG. 3) used for data transfer from the source node 100 to the destination node 110 are now available for use by any node on the network, using the RTS/CTS protocol.

Figure 4:
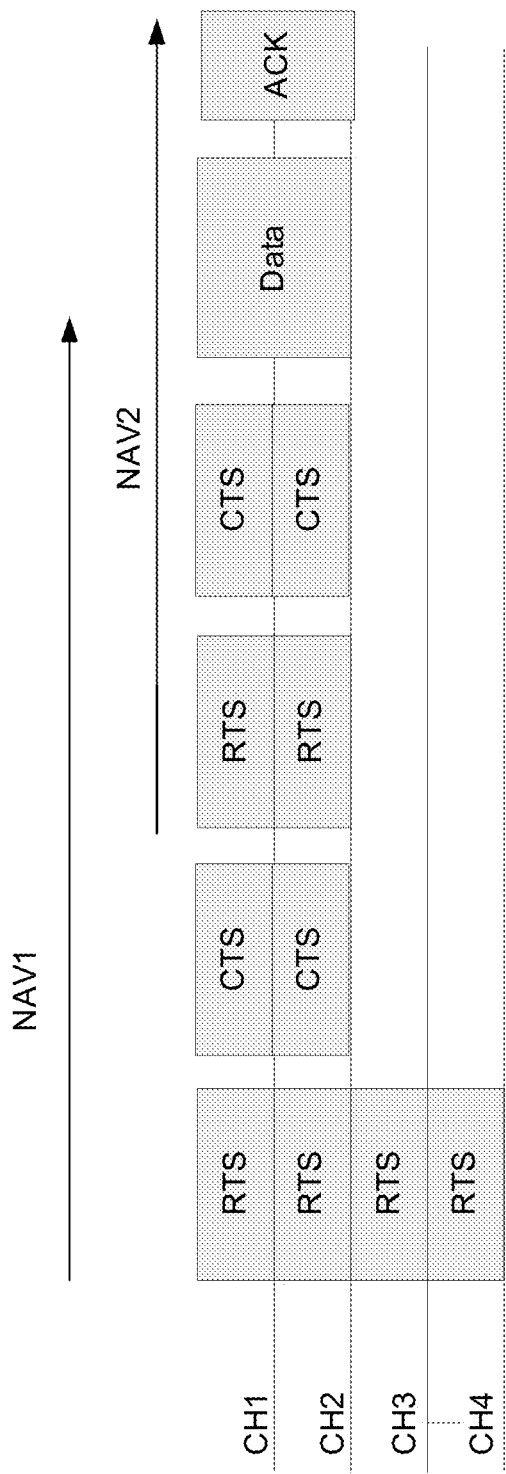
FIG. 4 shows the features of data transfer using the RTS/CTS protocol in accordance with a third embodiment of the invention.

A third embodiment of the invention is described below with reference to FIG. 1 and FIG. 4. In the third embodiment, unlike the first and second embodiments, a first RTS/CTS handshake is made between the source node 100 and destination node 110, in which a second RTS/CTS handshake may also be required to reset the NAV duration value, as explained below.

In the third embodiment, like the first and second embodiments, the RTS1 frame is sent on all of the channels intended for transmission by the source node 100 to the destination node 110. In one implementation of the second embodiment, the RTS1 frame is sent in duplicate mode with 11a preamble, with bandwidth information included. As shown in FIG. 4, the RTS1 frame is sent over four channels, CH1, CH2, CH3 and CH4. The destination node 110 receiving the RTS1 frame sends back a CTS1 frame, in which only two of the four channels, CH1 and CH2, are indicated as being available to receive data by the destination node.

In the third embodiment, the NAV duration is computed based on the bandwidth used by the RTS frame (e.g., the bandwidth of CH1, CH2, CH3 and CH4 combined) and the amount of data to be sent, subject to a maximum timeout limit (TXOP). In more detail, the NAV duration is set to a value equal to:

NAV duration=RTS1 frame time+Data *Tx* frame(s) time+CTS1 frame time+*Ack* frame time+3 *SIFS*.

In the third embodiment, the CTS1 frame is sent back from the destination node 110 to the source node 100 on the free channels with bandwidth information included. The CTS1 frame is preferably sent in duplicate mode with 11a preamble.

If the CTS1 frame is sent on a bandwidth smaller than the one included in the RTS1 frame, a second RTS2/CTS2 exchange is performed between the source node 100 and the destination node 110, in which a new NAV duration is set to a value based on the bandwidth used by the RTS2 frame and the amount of data to be sent, subject to a maximum timeout duration (TXOP).

In more detail, the new NAV duration is set to a value equal to:

new NAV duration=Data *Tx* frame(s) time+CTS2 frame time+*Ack* frame time+3 *SIFS*, in which the Data Tx frame(s) time is computed based on the CTS1 bandwidth. In the example shown in FIG. 4, the Data Tx frame(s) time is computed based on the CTS1 bandwidth of 40 MHz, corresponding to the bandwidth of CH1 and CH2 combined. In the third embodiment, the time required to compute the first NAV duration using the RTS1/CTS1 frames is typically short, and so the time lost due to the need to have a second handshake by having RTS2/CTS2 frames is more than offset by having the advantage of a correctly computed NAV duration by all nodes on the network that are affected by utilization of channels for data transfer between the source node 100 and the destination node 110.

Figure 5:
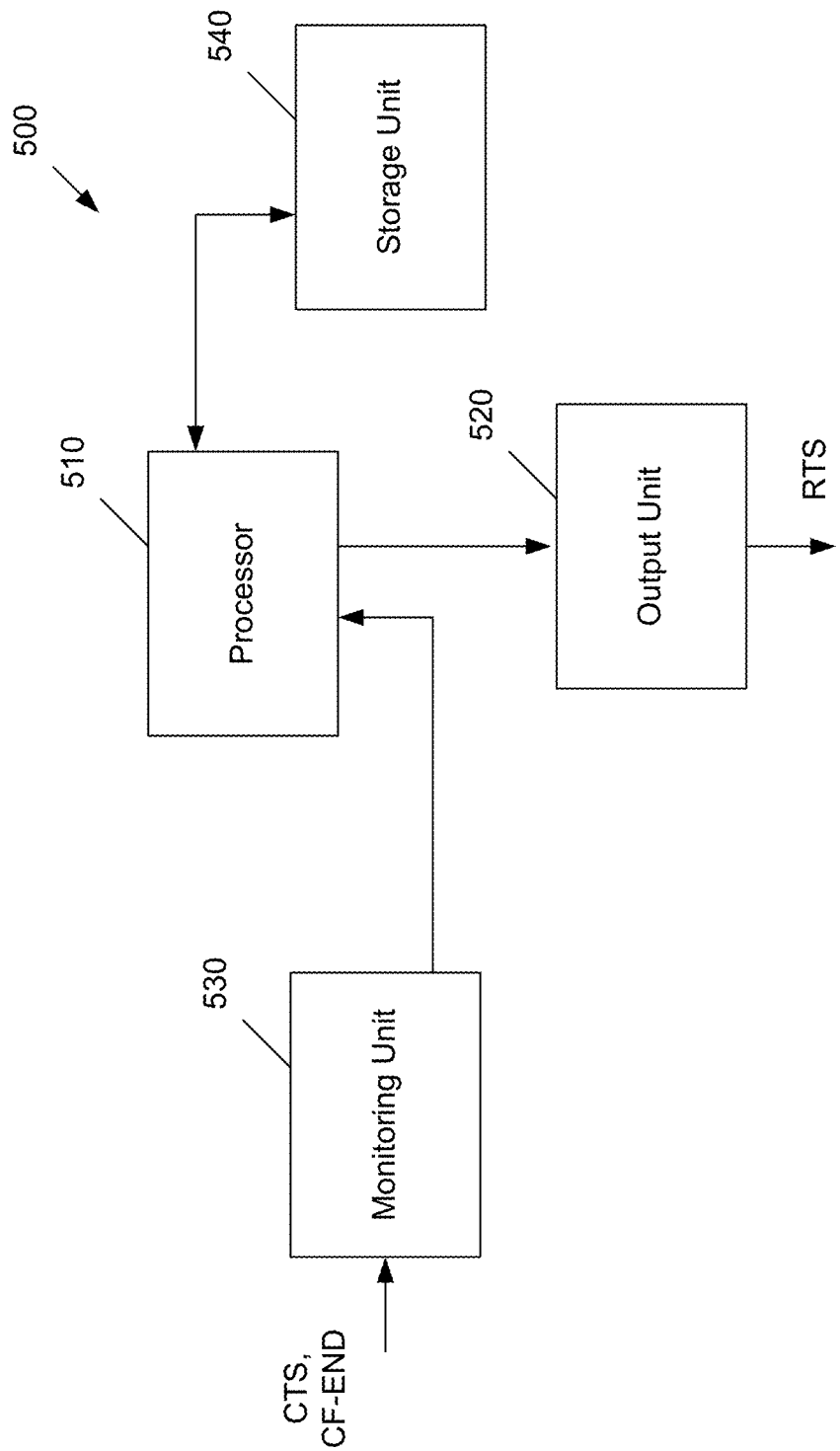
FIG. 5 is a block diagram showing elements making up a node in accordance with any of the first, second and third embodiments of the invention.

FIG. 5 shows in block diagram form the elements making up a node 500 in accordance with any of the first, second and third embodiments of the invention. A processor 510 determines that it needs to send data to a destination node, and outputs an RTS frame over all channels that it would like to send out the data. The RTS frame is computed based on the amount of data to be transmitted, and other default values known to the processor 510, and is output by way of an output unit 520. The node 500 includes a monitoring unit 530 that monitors each channel on the network for RTS frames and CTS frames, and provides that information to the processor 510. If an RTS frame is detected by the monitoring unit 530 and if the node 500 is the desired destination node as set forth in the RTS frame, the processor 510 determines which if any of the channels included in the RTS frame are available to receive data, and outputs a CTS frame accordingly. If the node 500 is not the desired destination node as set forth in the RTS frame, the node 500 sets its NAV duration based on the information set forth in the RTS frame. The monitoring unit 530 also monitors the channels for other frames, such as a CF-END frame that indicates that one or more channels previously allocated for data transfer are now freed up for future requests made by a node on the network. A storage unit 540 stores data to be transferred by the node 500, and is accessible by the processor 510 for enabling data transfer to a destination node when the node 500 is allowed to send data over at least one channel in the network.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method operative in a system utilizing a Request-to-Send/Clear-to-Send (RTS/CTS) protocol and that utilizes a plurality of channels for data transfer, comprising:
    sending, by a first device, an RTS frame over the plurality of channels, wherein the RTS frame comprises information used to set a network allocation vector (NAV), wherein the NAV is set to a time amount that is computed based on a minimum bandwidth value and an amount of data to be sent by the first device to a second device over the minimum bandwidth;
    receiving, by the first device, a CTS frame from the second device over at least one of the plurality of channels;
    transmitting, by the first device, data to the second device within the time duration set by the NAV using the at least one of the plurality of channels; and
    if the first device completes transmission of data to the second device within a time duration corresponding to the NAV, outputting, over the at least one of the plurality of channels, a data completion signal that indicates the at least one of the plurality of channels is available for use by other devices on the network.

2. The method according to claim 1, wherein the NAV is set to the time duration that is equal to data transmit frame(s) time+CTS frame time+acknowledgement frame time+(3*interframe spacing time).

3. The method according to claim 1, wherein the plurality of channels are wireless channels.

4. The method according to claim 1, wherein the minimum bandwidth corresponds to a bandwidth of one of the plurality of channels.

5. The method according to claim 1, wherein each of the other devices on the network that receives the data completion signal clears any residual NAV for the at least one of the plurality of channels.

6. An apparatus that utilizes a Request-to-Send/Clear-to-Send (RTS/CTS) protocol for sending data to another apparatus over a network, comprising:
a processor configured to send an RTS frame over a plurality of channels, the plurality of channels corresponding to channels over which data is desired to be sent from the apparatus to the another apparatus, wherein the RTS frame comprises information used to set a network allocation vector (NAV), and wherein the NAV is set to a time amount that is computed based on a minimum bandwidth value and an amount of data to be sent by the apparatus to the another apparatus over the minimum bandwidth;
a receiver configured to receive a CTS frame sent by the another apparatus over at least one of the plurality of channels;
wherein the apparatus transmits data to the another apparatus using the at least one of the plurality of channels, within the time duration set by the NAV; and
wherein if the apparatus completes transmission of data to the another apparatus within a time duration corresponding to the NAV, the processor is further configured to cause a data completion signal to be output, over the at least one of the plurality of channels, that indicates that the at least one of the plurality of channels is available for use by other devices on the network.

7. The apparatus according to claim 6, wherein the NAV is set to the time duration that is equal to data transmit frame(s) time+CTS frame time+acknowledgement frame time+(3*interframe spacing time).

8. The apparatus according to claim 6, wherein the plurality of channels are wireless channels.

9. The apparatus according to claim 6, wherein the minimum bandwidth corresponds to a bandwidth of one of the plurality of channels.

10. The apparatus according to claim 6, wherein each of the other devices on the network that receives the data completion signal clears any residual NAV for the at least one of the plurality of channels.

11. The method according to claim 1, wherein the data transmitted by the first device to the second device within the time duration set by the NAV is limited to a bandwidth indicated by the CTS frame.

12. A computer-program product for use in a system utilizing a Request-to-Send/Clear-to-Send (RTS/CTS) protocol and that utilizes a plurality of channels for data transfer, the computer-program product comprising a non-transitory computer-readable medium having instructions executable to:
send an RTS frame over the plurality of channels, wherein the RTS frame comprises information used to set a network allocation vector (NAV), and wherein the NAV is set to a time amount that is computed based on a minimum bandwidth value and an amount of data to be sent to another device over the minimum bandwidth;
receive a CTS frame sent by the another device over at least one of the plurality of channels;
transmit data to the another device within the time duration set by the NAV using the at least one of the plurality of channels; and
output, over the at least one of the plurality of channels, a data completion signal that indicates the at least one of the plurality of channels is available for use by other devices on the network if the transmission of data to the another device is completed within a time duration corresponding to the NAV.

13. The computer-program product according to claim 12, wherein the plurality of channels are wireless channels.

14. A method operative in a system utilizing a Request-to-Send/Clear-to-Send (RTS/CTS) protocol and that utilizes a plurality of channels for data transfer, comprising:
sending, by a first device, a first RTS frame over the plurality of channels, the first RTS frame including a first network allocation vector (NAV) set to a time duration that includes at least a second RTS frame and a second CTS frame;
receiving, by the first device, a first CTS frame based on receipt of the first RTS frame at a second device, the first CTS frame being received over at least one of the plurality of channels;
sending, by the first device, a second RTS frame over the at least one of the plurality of channels based on receipt of the first CTS frame over the at least one of the plurality of channels, the second RTS frame including a second NAV;
receiving, by the first device over the at least one of the plurality of channels, a second CTS frame from the second device based on the second device receiving the second RTS frame;
setting a NAV to a time duration that is based in part on information included in the second RTS frame; and
transmitting, by the first device, data to the second device within the time duration set by the second NAV using the at least one of the plurality of channels.

15. The method according to claim 14, wherein the time duration in which the data is transmitted by the first device to the second device is determined based on a bandwidth of the at least one of the plurality of channels in which the first CTS frame is received by the first device.

16. The method according to claim 14, wherein the second NAV is set to the time duration that is equal to second RTS frame time+second CTS frame time+data transmit frame(s) time+acknowledgement frame time+(3*interframe spacing time).

17. The method according to claim 14, wherein the plurality of channels are wireless channels.

18. A computer-program product for use in a system utilizing a Request-to-Send/Clear-to-Send (RTS/CTS) protocol and that utilizes a plurality of channels for data transfer, the computer-program product comprising a non-transitory computer-readable medium having instructions executable to:
send a first RTS frame over the plurality of channels;
receive a first CTS frame sent by another device based on the receipt of the first RTS frame by the another device, the first CTS frame being received over at least one of the plurality of channels;
send a second RTS frame over the at least one of the plurality of channels based on receipt of the first CTS frame over the at least one of the plurality of channels;
receive a second CTS frame output by the second device based on the second device receiving the second RTS frame;
set a network allocation vector (NAV) to a time duration that is based in part on information included in the second RTS frame; and
transmit data to the second device within the time duration set by the NAV using the at least one of the plurality of channels.

19. The computer-program product according to claim 18, wherein the plurality of channels are wireless channels.

20. An apparatus that utilizes a Request-to-Send/Clear-to-Send (RTS/CTS) protocol for sending data to another apparatus over a network, comprising:
- means for sending an RTS frame over a plurality of channels, wherein the RTS frame comprises information used to set a network allocation vector (NAV), and wherein the NAV is set to a time amount that is computed based on a minimum bandwidth value and an amount of data to be sent by the apparatus to another apparatus over the minimum bandwidth;
- means for receiving a CTS frame over at least one of the plurality of channels;
- means for transmitting data to the another apparatus within the time duration set by the NAV using the at least one of the plurality of channels; and
- means for outputting, over the at least one of the plurality of channels, a data completion signal that indicates the at least one of the plurality of channels is available for use by other devices on the network if the apparatus completes transmission of data to the another apparatus within a time duration corresponding to the NAV.

21. The apparatus according to claim 20, wherein the NAV is set to the time duration that is equal to data transmit frame(s) time+CTS frame time+acknowledgement frame time+(3*interframe spacing time).

22. The apparatus according to claim 20, wherein the plurality of channels are wireless channels.

23. The apparatus according to claim 20, wherein the minimum bandwidth corresponds to a bandwidth of one of the plurality of channels.

24. An apparatus that utilizes a Request-to-Send/Clear-to-Send (RTS/CTS) protocol for sending data to another apparatus over a network, comprising:
- means for sending a first RTS frame over the plurality of channels, the first RTS frame including a first network allocation vector (NAV) set to a time duration that includes at least a second RTS frame and a second CTS frame;
- means for receiving a first CTS frame over at least one of the plurality of channels;
- means for sending a second RTS frame over the at least one of the plurality of channels based on receipt of the first CTS frame over the at least one of the plurality of channels, the second RTS frame including a second NAV;
- means for receiving a second CTS frame over the at least one of the plurality of channels;
- means for setting a NAV to a time duration that is based in part on information included in the second RTS frame; and
- means for transmitting data to another apparatus within the time duration set by the second NAV using the at least one of the plurality of channels.

25. The apparatus according to claim 24, wherein the time duration in which the data is transmitted by the first device to the second device is determined based on a bandwidth of the at least one of the plurality of channels in which the first CTS frame is received by the first device.

26. The apparatus according to claim 24, wherein the second NAV is set to the time duration that is equal to second RTS frame time+second CTS frame time+data transmit frame(s) time+acknowledgement frame time+(3*interframe spacing time).

27. The apparatus according to claim 24, wherein the plurality of channels are wireless channels.

* * * * *